United States Patent
Braghiroli et al.

(10) Patent No.: US 12,358,639 B2
(45) Date of Patent: Jul. 15, 2025

(54) AIRCRAFT CAPABLE OF HOVERING INCLUDING A BY-PASS AIR INTAKE OPEN TO THE MOTOR BAY

(71) Applicant: LEONARDO S.P.A., Rome (IT)

(72) Inventors: Marco Braghiroli, Samarate (IT); Enrico Canta, Samarate (IT)

(73) Assignee: LEONARDO S.P.A., Rome (IT)

( * ) Notice: Subject to any disclaimer, the term of this patent is extended or adjusted under 35 U.S.C. 154(b) by 283 days.

(21) Appl. No.: 17/920,310

(22) PCT Filed: Apr. 27, 2021

(86) PCT No.: PCT/IB2021/053459
§ 371 (c)(1),
(2) Date: Oct. 20, 2022

(87) PCT Pub. No.: WO2021/220154
PCT Pub. Date: Nov. 4, 2021

(65) Prior Publication Data
US 2023/0159181 A1 May 25, 2023

(30) Foreign Application Priority Data

Apr. 27, 2020 (EP) .................................... 20171458

(51) Int. Cl.
*B64D 33/10* (2006.01)
*B64C 27/04* (2006.01)

(52) U.S. Cl.
CPC .............. *B64D 33/10* (2013.01); *B64C 27/04* (2013.01)

(58) Field of Classification Search
CPC .......... B64D 33/08; B64D 33/10; B64C 27/04
(Continued)

(56) References Cited

U.S. PATENT DOCUMENTS 5,265,408 A 11/1993 Sheoran et al.
6,606,854 B1 8/2003 Siefker et al.
(Continued)

FOREIGN PATENT DOCUMENTS

CN 110691897 A 1/2020
EP 2724934 A1 4/2014
(Continued)

OTHER PUBLICATIONS

International Search Report and Written Opinion in corresponding International Patent Application No. PCT/IB2021/052324, mailed May 21, 2021 (13 pages).

(Continued)

*Primary Examiner* — Brady W Frazier
(74) *Attorney, Agent, or Firm* — Leason Ellis LLP

(57) ABSTRACT

An aircraft with a motor bay is described; a motor system with a discharge duct; a heat exchanger arranged outside said motor system; a first air intake; a first duct along which the heat exchanger is arranged; a first converging nozzle having a downstream section fluidically connected with the discharge duct and with the first duct so as to create a first flow rate of air adapted to cool the heat exchanger; and a second air intake that is open in the motor bay and distinct from the first air intake; a second converging nozzle having a second downstream section fluidically connected with the discharge duct and with the motor bay, so as to create a second flow rate of cooling air of the motor bay directed from the second air intake towards the discharge duct and by-passing the motor system.

15 Claims, 13 Drawing Sheets

(58) Field of Classification Search
USPC .................................................... 244/17.11
See application file for complete search history.

(56) References Cited

U.S. PATENT DOCUMENTS

| | | | | |
|---|---|---|---|---|
| 2010/0230530 A1* | 9/2010 | Nannoni | ............... | B64D 33/02 |
| | | | | 244/17.11 |
| 2014/0119891 A1* | 5/2014 | Schmittenberg | .......... | F02C 7/05 |
| | | | | 415/121.2 |
| 2014/0367476 A1 | 12/2014 | Pomme | | |
| 2019/0003430 A1* | 1/2019 | Dionne | .................... | F01P 7/14 |

FOREIGN PATENT DOCUMENTS

| | | | |
|---|---|---|---|
| EP | 3056423 | A1 | 8/2016 |
| JP | H07277292 | A | 10/1995 |
| JP | 08-014125 | A | 1/1996 |
| JP | 2005507044 | A | 3/2005 |
| JP | 2015525321 | A | 9/2015 |
| JP | 2016153297 | A | 8/2016 |
| WO | 2003037715 | A1 | 5/2003 |
| WO | 2005045238 | A1 | 5/2005 |

OTHER PUBLICATIONS

Japanese Office Action in JP Application No. 2022-565664, mailed Nov. 5, 2024, an English Translation attached hereto (6 pages).

* cited by examiner

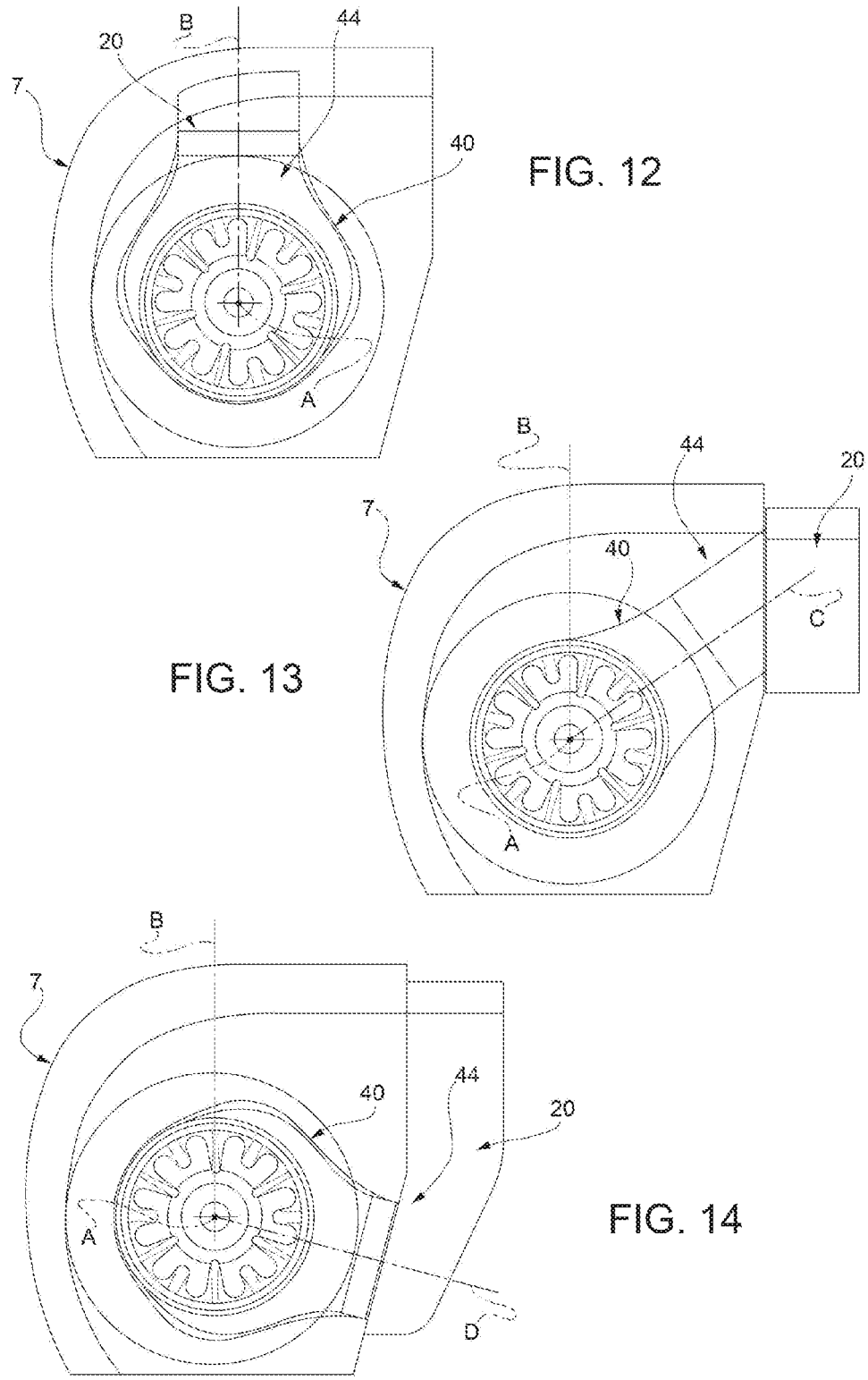

AIRCRAFT CAPABLE OF HOVERING INCLUDING A BY-PASS AIR INTAKE OPEN TO THE MOTOR BAY

CROSS-REFERENCE TO RELATED APPLICATIONS

This patent application is a U.S. National Phase Application under 35 U.S.C. § 371 of International Patent Application No. PCT/IB2021/053459, filed on Apr. 27, 2021, which claims priority from Italian patent application no. 20171458.1, filed on Apr. 27, 2020, incorporated by reference, as if expressly set forth in their respective entireties herein.

TECHNICAL FIELD

The present invention relates to an aircraft capable of hovering, in particular a helicopter or a convertiplane.

BACKGROUND ART

Helicopters are known essentially comprising a fuselage, a main rotor rotatable around a first axis and arranged on a top portion of the fuselage, and an anti-torque rotor arranged at a tail end of the helicopter and rotatable around a second axis, transverse to the first axis.

The helicopters of the known type also comprise a motor system and a transmission group for transmitting the motion from an outlet shaft of the motor system to the main rotor.

In greater detail, the motor system, known in the sector as the "turbo-shaft", creates an open thermodynamic cycle.

The motor system comprises:
  a support body;
  an air intake adapted to allow the entry of a first flow rate of air;
  a compressor fluidically connected to the air intake, supplied with the aforesaid first flow rate of air and adapted to compress said first flow rate of air;
  a combustion chamber, in which the first flow rate of compressed air from the compressor is mixed with a second flow rate of fuel and undergoes a combustion process generating a third flow rate of high temperature exhaust gases; and
  one or more turbines, inside which the third flow rate of high temperature exhaust gases leaving the combustion chamber expands by driving the compressor and the outlet shaft of the motor system in rotation independently of each other.

Each motor system also comprises:
  a converging nozzle arranged downstream of the respective turbine and adapted to accelerate the third flow rate of exhaust gases; and
  an exhaust gas discharge duct ending in a respective opening of the support body and inside which the converging nozzle is arranged.

The helicopters of the known type also comprise a lubrication system adapted to allow the lubrication of the motor system and to contribute to the cooling of the motor system itself.

In more detail, the lubrication system comprises:
  a collection tank for a lubricating fluid, for example oil; and
  a distribution circuit configured so as to distribute the lubricating fluid in certain regions of the motor system and to allow the return of said lubricating fluid to the tank.

During said circulation, the lubricating fluid comes into contact with the moving components of the motor system and consequently increases its temperature.

In order to prevent the temperature of the lubricating fluid from becoming excessive, the lubrication system comprises, in the known solutions:
  a fan adapted to generate a fourth stream of fresh air; and
  a heat exchanger that allows to cool the lubricating fluid through the heat exchange with the fourth stream of air generated by the fan.

The use of the fan or similar active systems leads to an increase in weight of the helicopter.

The actuation of said fan or similar systems of the active type also requires a rate of power, for example electrical, directly extracted from the on-board system, or mechanical, made available by the motor system and which is subtracted from the actual value of mechanical power available to the motor shaft.

The fan and the relative driving group also require respective housings inside the helicopter, which sometimes give rise to problems of integration with other systems and/or with the structure and the shape of the fuselage itself.

Finally, the fan and the relative driving group are inevitably subject to risks of failure, thus worsening the overall reliability of the helicopter's motor system. Such solutions of the known type also require more frequent inspection and maintenance intervals, thus increasing the overall operating costs of the helicopter.

WO-A-2003/037715 describes a passive cooling system for an auxiliary power unit of an aircraft.

The auxiliary power unit is designed to supply the various systems on board the aircraft with electric power and compressed air.

The auxiliary power unit is basically a gas turbine system equipped with a pair of compressors housed inside a nacelle.

Said auxiliary power unit also comprises a heat exchanger for cooling a lubricating fluid.

The gas turbine comprises, in a known manner, a further discharge duct for the mixture of exhaust gases housed inside the nacelle.

In a first embodiment, the nacelle defines:
  a single air intake to supply the compressors and the heat exchanger with a stream of air; and
  an outlet mouth of the further discharge duct of the gas turbine.

The nacelle also houses:
  a first duct arranged downstream of the single air intake; and
  a second and a third duct, which define respective branches of the first duct.

In greater detail, the second duct extends between the first duct and a first suction mouth of one of the compressors.

The third duct branches, in turn, into a first and a second section arranged downstream of the first duct.

The first section fluidically connects the first duct and a second suction mouth of the other one of the compressors.

The second section fluidically connects the first duct and is arranged inside the internal volume of the nacelle. The heat exchanger is interposed along the second section.

The further discharge duct of the gas turbine has a converging nozzle with progressively decreasing areas. The nozzle has, in turn, a downstream section fluidically connected with the internal volume of the nacelle downstream of the second section.

In this way, the exhaust gas flow in the discharge duct causes a reduction in the speeds of the exhaust gases and a consequent depressurization at the downstream section of the nozzle and, consequently, within the nacelle regions located downstream of the second section.

Said depressurization causes a first stream of air through the heat exchanger and a second stream of air towards the first and second suction mouths of the compressors.

In other words, the nozzle defines an ejector at its downstream section.

Since the second section is open inside the volume of the nacelle, the first stream of air cools both the heat exchanger and the internal volume of the nacelle.

Consequently, it is not possible to independently control the cooling of the exchanger and the cooling of the internal volume of the nacelle.

WO-A-2003/037715 describes further embodiments, in each of which the stream of cooling air of the internal volume of the nacelle is driven by the ejector into the discharge duct of the motor system.

Consequently, the same stream of air cools both the heat exchanger and the internal volume of the nacelle.

A need is felt in the sector to independently and optimally control the cooling of the casing of the motor system and the heat exchanger.

This with the aim of optimising the cooling of the nacelle of the motor system and of the heat exchanger from a dimensional and functional point of view.

DISCLOSURE OF INVENTION

The object of the present invention is the realization of an aircraft capable of hovering, which allows to satisfy the aforesaid requirement in a simple and economic way.

BRIEF DESCRIPTION OF THE DRAWINGS

For a better understanding of the present invention, a preferred embodiment is described below, by way of non-limiting example and with reference to the accompanying drawings, wherein:

FIG. 12 is a front view of further components of the motor system of Figures from 1 to 11;

FIG. 13 illustrates a further embodiment of the further components of FIG. 12; and FIG. 14 illustrates a further embodiment of the further components of FIG. 13.

BEST MODE FOR CARRYING OUT THE INVENTION

Figure 1:
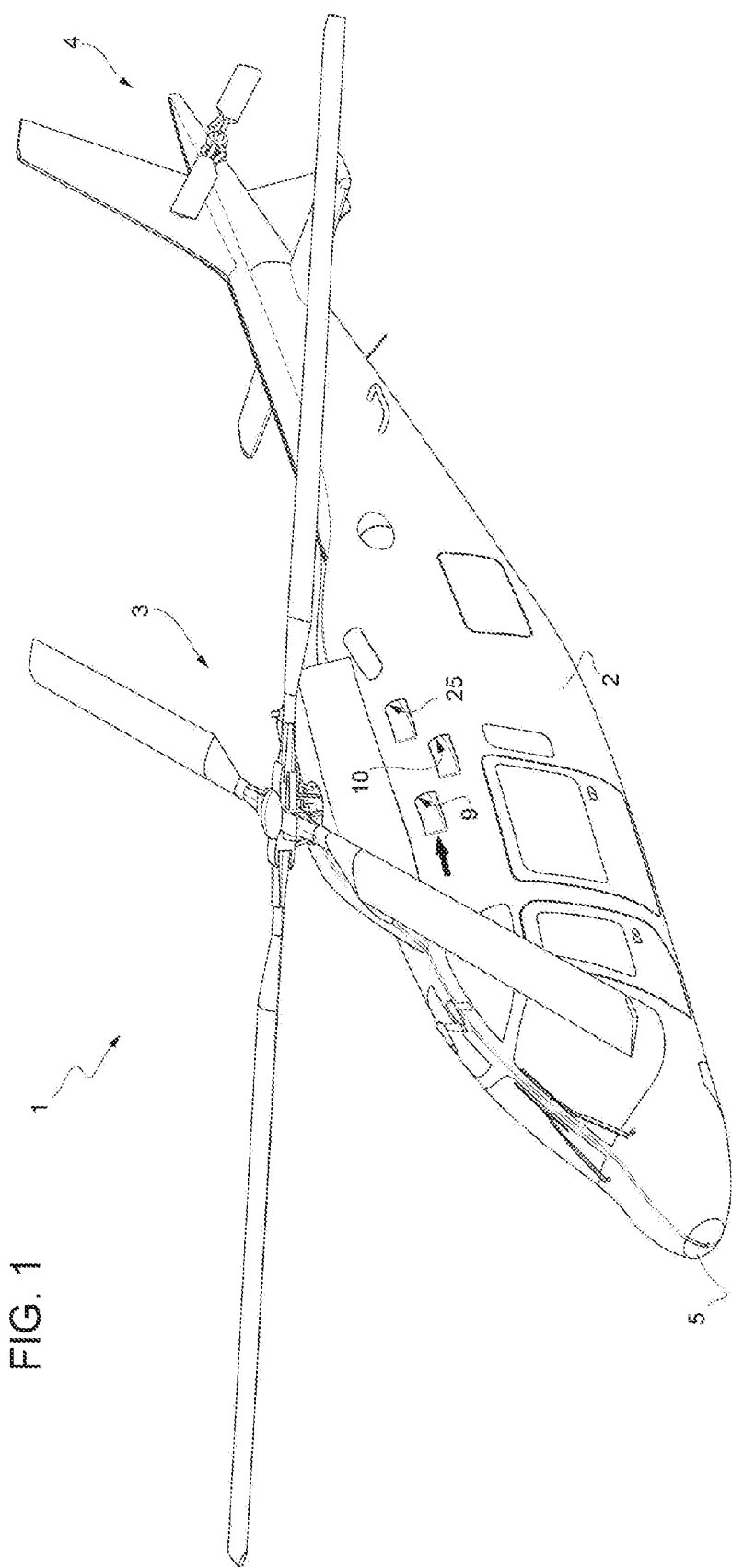
FIG. 1 illustrates a perspective view of a helicopter according to the invention.

With reference to FIG. 1, numeral 1 indicates a helicopter essentially comprising a fuselage 2 provided with a front nose 5, a main rotor 3 placed at a top of the fuselage 2 and rotatable around a first axis, and a tail rotor 4 carried by a drift protruding from the fuselage 2 on the side opposite the nose 5 and rotatable around a second axis transverse to the first axis.

It should be noted that in the following of the present description, expressions such as "above", "below", "front", "rear" and the like are used with reference to advanced flight or "hovering" conditions of the helicopter 1 illustrated in FIG. 1 and wherein the main rotor 3 is arranged above the fuselage 2 and the nose 5 is arranged in front of the tail rotor 4.

The helicopter 1 comprises a motor system 6 housed in a motor bay 8 delimited by a support body 7.

The motor bay 8 is fluidically connected with an air intake 10 adapted to allow the entry of a stream of cooling air into the motor bay 8 itself.

The helicopter 1 also comprises a transmission group (not illustrated as known per se and not part of the present invention) adapted to connect an outlet shaft (also not illustrated) of the motor system 6 to a shaft for driving the main rotor 3 rotatable about an axis A.

The motor system 6 behaves like a gas turbine plant realising an open Joule-Brayton thermodynamic cycle.

The motor system 6 essentially comprises (FIG. 2):
- an air intake 9 obtained in a flank of the fuselage 2 and through which a first flow rate of low temperature air is sucked into the motor bay 8;
- a compressor 11 (only schematically illustrated) provided with a suction duct (not illustrated) of the first flow rate of air fluidically connected with the air intake 9 and adapted to compress said first flow rate of air;
- a combustion chamber 13 (only schematically illustrated), in which the first flow rate of air compressed by the compressor 11 reacts with a second fuel flow rate generating a third flow rate of high temperature exhaust gases; and
- a pair of turbines 14 (only schematically illustrated), inside which the third flow rate of high temperature exhaust gases leaving the combustion chamber 13 expands by driving the compressor 11 and the outlet shaft in rotation.

In particular, the compressor 11, the turbines 14 and the outlet shaft are rotatable around the axis A.

The air intake 9 is arranged laterally to the axis A and is distinct from the air intake 10.

The motor system 6 further comprises a duct 17 for discharging the third flow rate of exhaust gases ending in a respective mouth 18 of the support body 7.

The helicopter 1 also comprises a lubrication system (known per se and not illustrated in detail) adapted to allow the lubrication and to contribute to the cooling of the motor system 6.

In greater detail, the lubrication system comprises a collection tank (not illustrated) of a lubricating fluid, a distribution circuit (also not illustrated) configured to distribute the lubricating fluid in certain regions of the motor system 6 and to allow the return of said lubricating fluid into the tank.

During said circulation, the lubricating fluid comes into contact with the moving components of the motor system 6 and increases its temperature.

The lubrication system further comprises a heat exchanger 20, which allows to cool the lubricating fluid by means of the heat exchange with a stream of air.

In other words, the heat exchanger 20 is a radiator crossed by the lubricating fluid and cooled by the stream of air.

The heat exchanger 20 is arranged outside the motor system 6.

The helicopter 1 further comprises:
- a further air intake 25 open on a flank of the fuselage 2 and adapted to suck a fourth flow rate of air; and
- a duct 26 along which the heat exchanger 20 is interposed and through which the fourth flow rate of air flows.

The air intake 25 is distinct from the air intake 10.

The duct 26, in turn, comprises:
- an inlet section 27 extending between the air intake 25 and the heat exchanger 20; and
- a pair of channels 28 (FIGS. 2, 4 and 7 to 10) extending from the heat exchanger 20 and arranged on the opposite side of the section 27 with respect to the heat exchanger 20.

The helicopter 1 furthermore comprises a converging nozzle 15 arranged downstream of the turbines 14 and crossed by the third flow rate of exhaust gases.

The nozzle 15 has a tubular shape of axis A and comprises:
- a surface 31 radially internal to the axis A and shaped like a tapered cone, running from the turbines 14 towards the discharge duct 17; and
- a plurality of lobes 32 angularly equally spaced around the axis A and protruding in a cantilever fashion from the surface 31 towards the axis A itself.

The nozzle 15 comprises (FIGS. 3, 4 and 6 to 9):
- an upstream section 38 fluidically connected with the turbines 14; and
- a downstream section 39 opposite the upstream section 38 and arranged on the side of the discharge duct 17.

The downstream section 39 of the nozzle 15 is fluidically connected with the channels 28 of the duct 26 and with the discharge duct 17.

Figure 2:
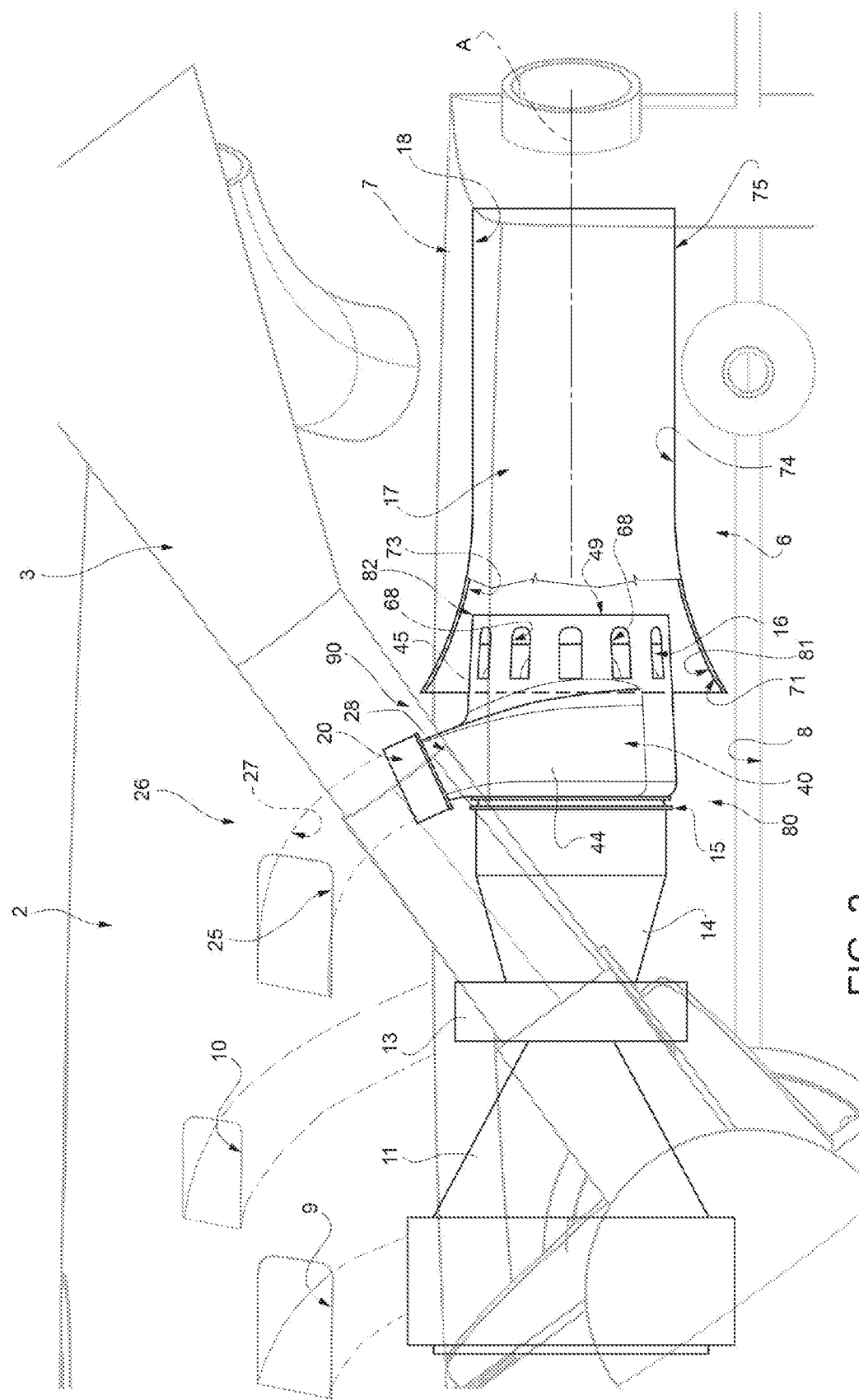
FIG. 2 is a view from above and on a strongly enlarged scale of the helicopter of FIG. 1 and of a relative motor system, on a strongly enlarged scale and with parts removed for clarity's sake.
Figure 3:
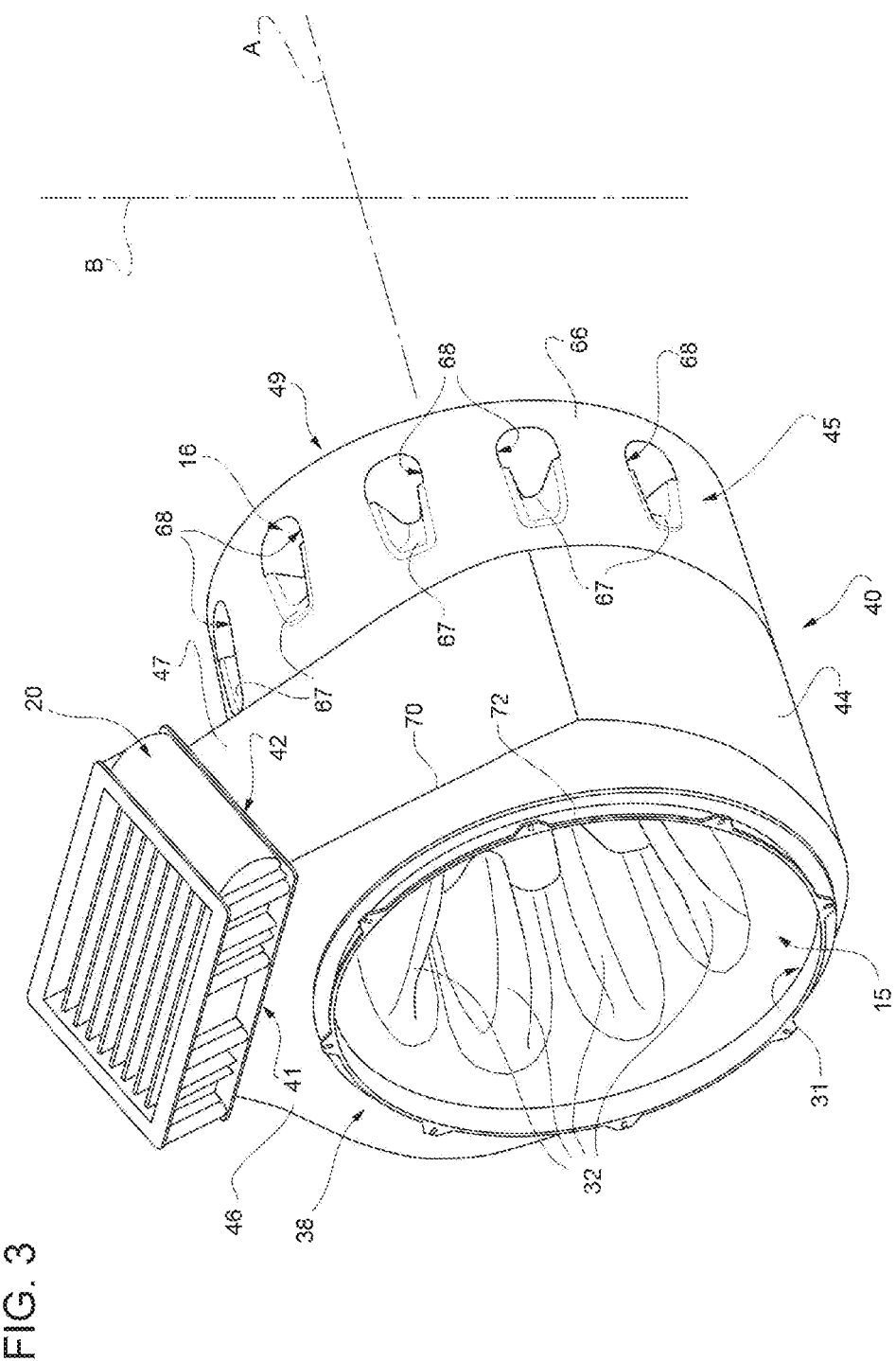
FIG. 3 is a front perspective view according to a first visual angle and on a further enlarged scale of some components of the motor system of the helicopter of FIGS. 1 and 2.
Figure 4:
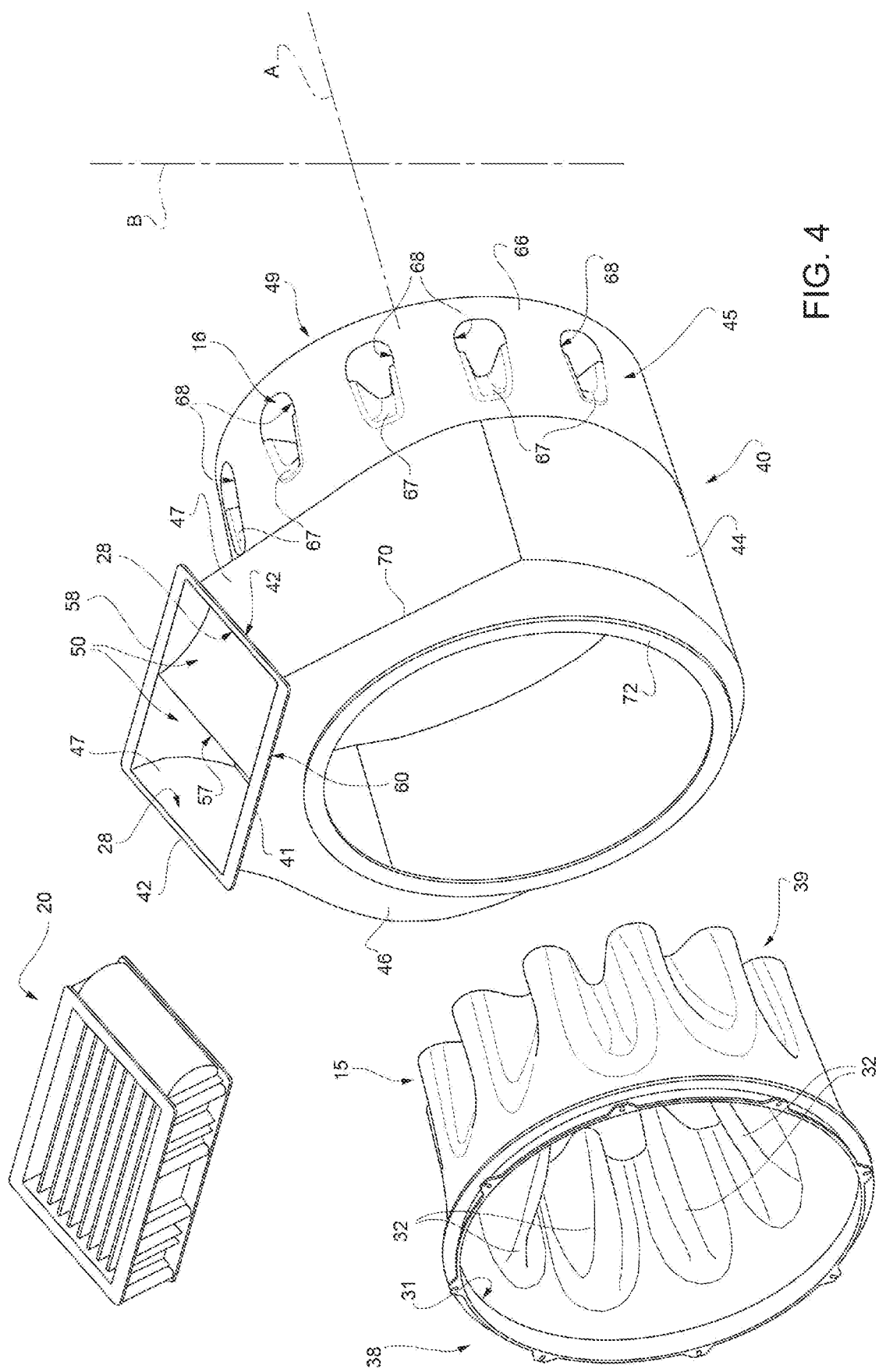
FIG. 4 is an exploded view of the components of the motor system of FIG. 3.
Figure 5:
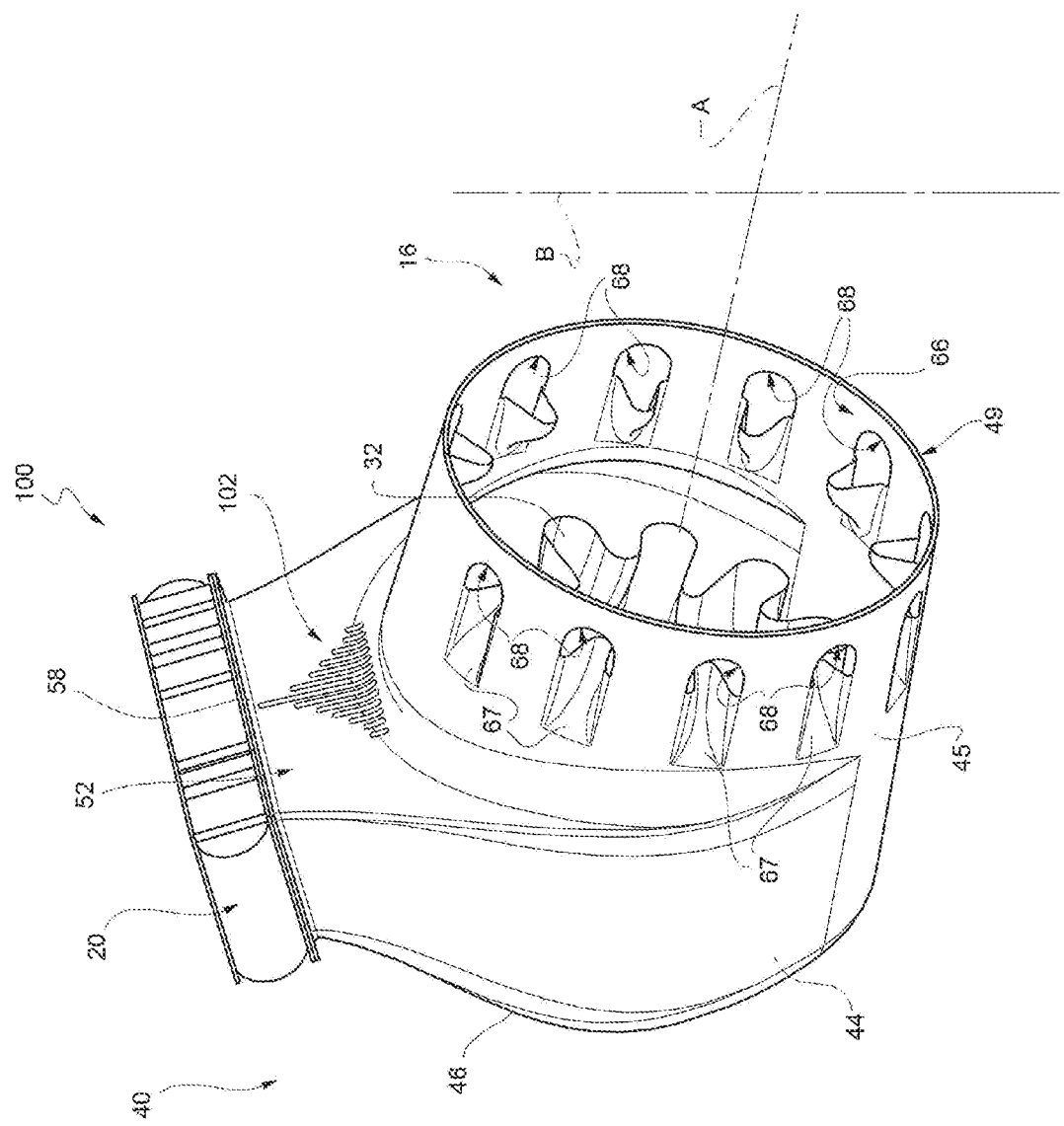
FIG. 5 is a rear perspective view according to a further visual angle from FIG. 3 and on a further enlarged scale of the components of the motor system of FIGS. 3 and 4.
Figure 6:
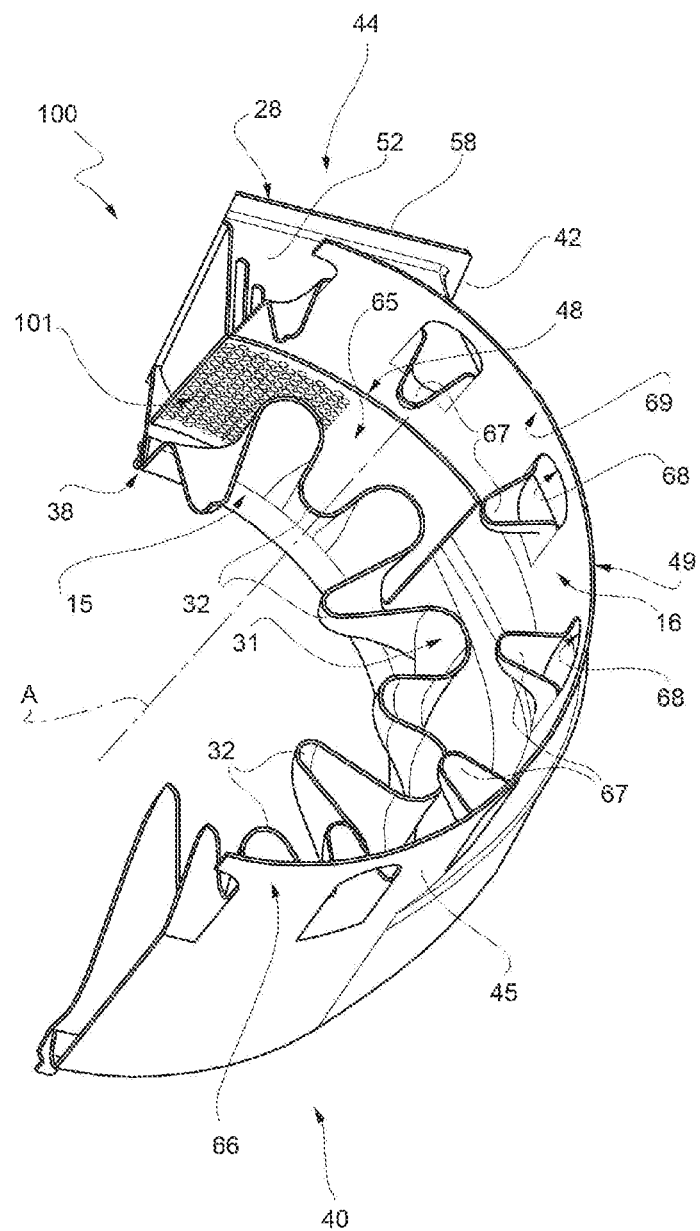
FIGS. 6 and 7 illustrate in a perspective view and on a further enlarged scale the components of FIGS. 3 to 5, with parts removed for clarity's sake.

With reference to FIG. 2, the helicopter 1 comprises an ejector 80 formed by the downstream section 39 of the nozzle 15 and by the channels 28 of the duct 26.

The term ejector or jet-pump means in the present description a pump formed by a converging nozzle inside which a primary stream of a fluid is conveyed and having a downstream section fluidically connected to a duct. The converging shape of the nozzle causes a lowering of the static pressure in the downstream section of the nozzle, which allows to suck a secondary stream through the duct. Said primary and secondary streams mix in the outlet section of the nozzle.

The channels 28 comprise respective openings 43 (FIG. 8) opposite the heat exchanger 20 and open at the downstream section 39 of the nozzle 15.

More precisely, the nozzle 15 causes a lowering of the static pressure of the third flow rate of exhaust gases leaving the turbines 14 at the downstream section 39. Said lowering of static pressure draws the fourth flow rate of air through the duct 26 which cools the heat exchanger 20 and mixes in the downstream section with the third flow rate of exhaust gases giving rise to a fifth flow rate of exhaust gases and air through the downstream section 39.

The nozzle 15 is housed partly inside the nozzle 16 and is arranged upstream of the discharge duct 17.

The downstream section 39 of the nozzle 15 is fluidically connected with the channels 28.

Advantageously, the helicopter 1 comprises a further converging nozzle 16 (FIGS. 2 to 7 and 9 to 11) and having a downstream section 49 fluidically connected with the discharge duct 17 and the motor bay 8, so as to create a sixth flow rate of cooling air of the motor bay 8 itself directed from the air intake 10 towards the discharge duct 17 and by-passing the motor system 6.

This sixth flow rate of air cools the motor bay 8.

In greater detail, the nozzle 16 comprises an upstream section 48 opposite the downstream section 49 and fluidically connected with the downstream section 39 of the nozzle 15.

The downstream section 49 is fluidically connected with the motor bay 8, as will be described in more detail below.

The helicopter 1 comprises a further ejector 90 formed by the nozzle 16 and the motor bay 8.

More precisely, the nozzle 16 causes a lowering of the static pressure of the fifth flow rate of air and exhaust gases at the downstream section 49. Said lowering of static pressure draws a sixth flow rate of air through the motor bay 8 which cools the motor bay 8 itself and mixes in the downstream section 49 with the fifth flow rate of exhaust gases and air giving rise to a seventh flow rate of exhaust gases and air through the downstream section 49.

With reference to FIGS. 3 to 11, the nozzle 15 is arranged upstream of the nozzle 16, running from the turbine 14 towards the discharge duct 17.

The nozzles 15, 16 are arranged coaxially to the axis A.

The nozzle 15 is housed partly inside the nozzle 16 and is arranged upstream of the discharge duct 17.

The nozzle 15 is also radially spaced from the nozzle 16.

With reference to FIGS. 3 to 8, 10 and 11, the helicopter 1 also comprises a support body 40, which supports the heat exchanger 20.

The support body 40 integrally defines the channels 28 and the nozzle 16 and houses the nozzle 15.

In greater detail, the support body 40 integrally comprises, running from the turbine 14 towards the discharge duct 17:
- a portion 44 protruding with respect to the axis A and inside which the nozzle 15 is housed and defining the channels 28 of the duct 16; and
- a tubular portion 45 with respect to the axis A, housed partly inside the portion 44 and partly inside the discharge duct 17, and defining therewith the nozzle 16.

The portion 44 supports the heat exchanger 20 and defines the channels 28.

In particular, the portion 44 comprises:
- a discoidal wall 46, orthogonal to the axis A and delimiting the support body 40 on the side of the turbine 14; and
- a curved wall 47 protruding in a cantilever fashion from an end edge 70 of the wall 46 radially opposite to the axis A towards the discharge duct 17.

The walls 44, 47 surround the portion 45 below and are open above the portion 45.

The wall 46 further comprises an end edge 72 radially internal and opposite the end edge 70.

Figure 7:
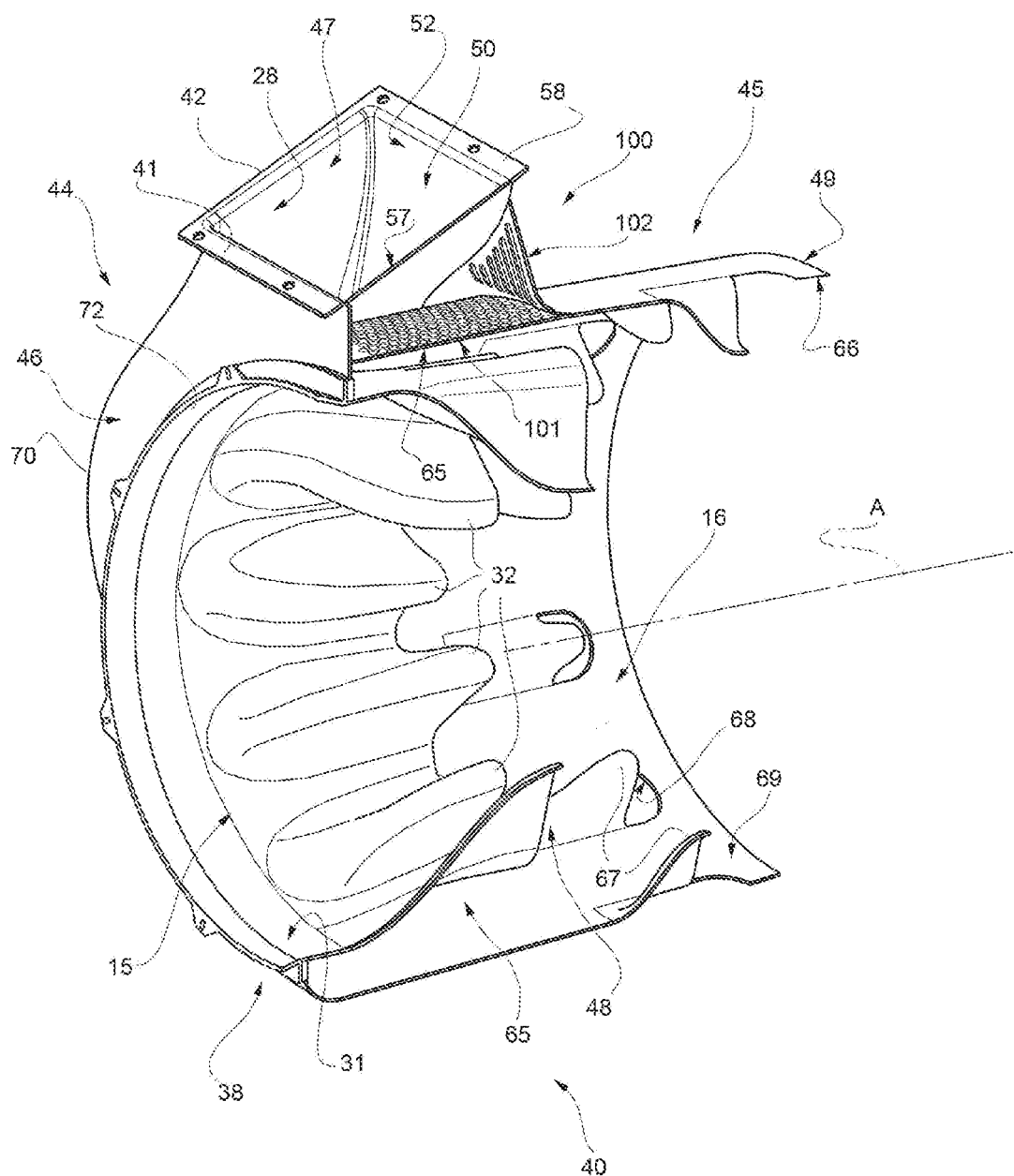

The nozzle 15 is fixed circumferentially to the end edge 72 (FIG. 7).

The wall 46 furthermore comprises an upper end 41 which is rectilinear and orthogonal with respect to the axis A, and is closed below the portion 45.

The wall 47 comprises a pair of upper ends 42, parallel to the axis A and connected to the end 41. The wall 47 is also closed below the portion 45.

The support body 40 further comprises (FIG. 7):
a pair of walls 50 facing respective portions 51 (FIG. 8) of corresponding walls 47; and
a wall 52 axially opposed to the wall 46.

The walls 47, 50 extend in an axially interposed position between the walls 46, 52.

The walls 47, 50 extend symmetrically to each other with respect to an axis B orthogonal to the axis A and arranged, in use, vertically.

More precisely, each wall 50 comprises:
an end 57 fixed to the heat exchanger 20;
an end 59 that is free and opposite to the respective end 57.

Each wall 52 in turn comprises an end 58 fixed to the heat exchanger 20 and connected to the respective end 57.

Figure 8:
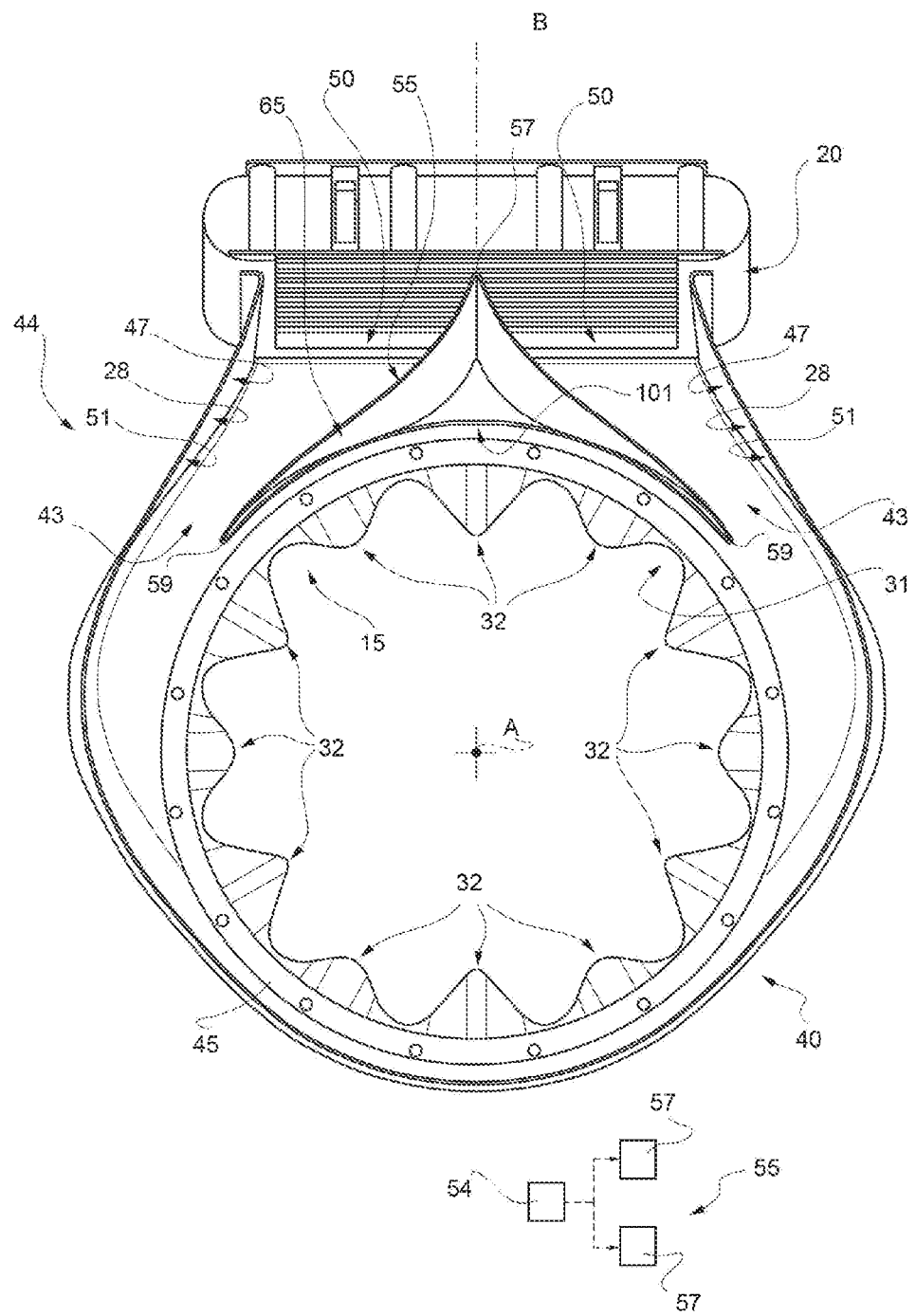
FIG. 8 is a rear view of the components of the motor system of FIGS. 3 to 7.
Figure 9:
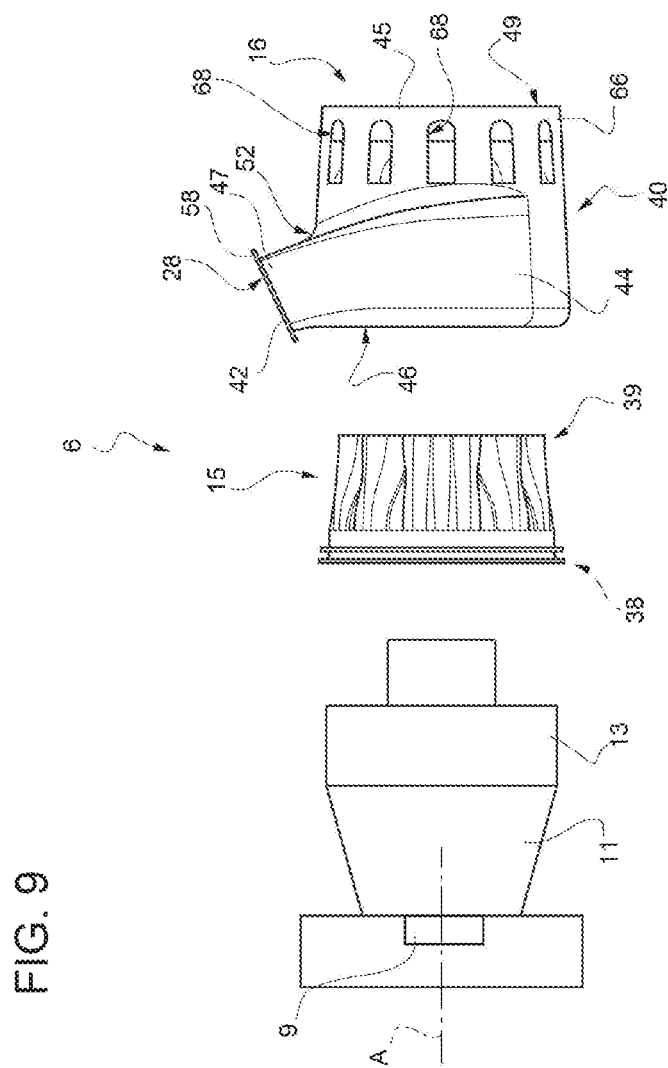
FIG. 9 illustrates an exploded view of the components of the motor system of Figures from 1 to 8.
Figure 10:
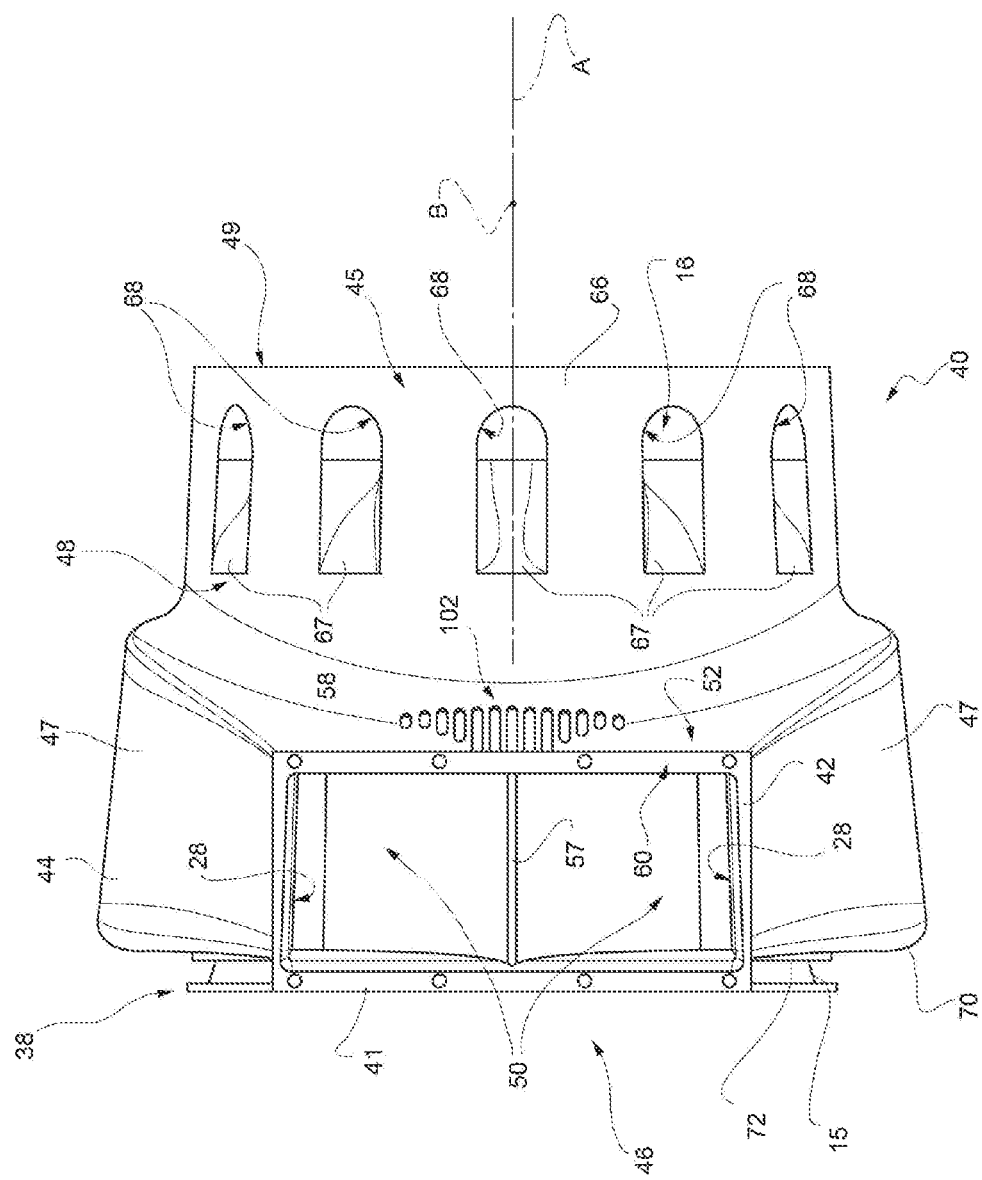
FIGS. 10 and 11 respectively illustrate a top and perspective view of the components of the motor system of FIGS. 3 to 9.
Figure 11:
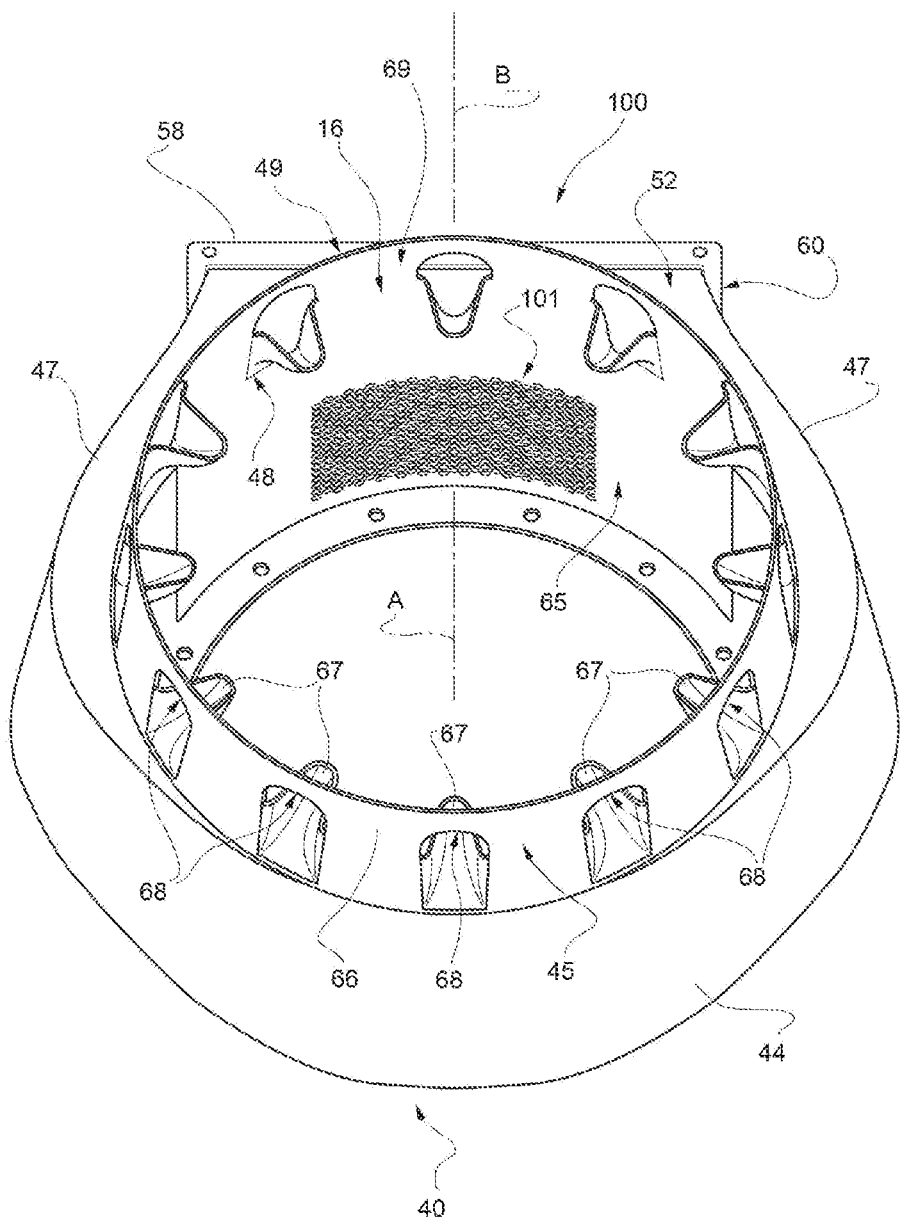

The walls 50 define a diverging cusp running from the respective common ends 57 towards the respective ends 59 that are free and spaced apart between them (FIG. 8).

The support body 40 defines (FIG. 4) a perimetric end edge 60, open and fixed to the heat exchanger 20.

The edge 60 is delimited by the end 41 of the wall 46 and by the ends 58 of the walls 57 by respective parts that are axially opposite each other.

The edge 60 is also delimited by the ends 42 of the wall 47.

The edge 60 is, in the case illustrated, rectangular.

The ends 57 of the walls 50 are arranged parallel to the ends 42 and cross the edge 60.

More particularly, the ends 57 of the walls 50 divide the edge 60 into two equal areas defining respective inlet sections of respective channels 28 opposite the respective openings 43.

The ends 41, 58 are axially opposed to each other.

The ends 42, 57 are opposed to each other and axially interposed between the ends 41, 42.

With particular reference to FIG. 8, each opening 43 is axially delimited by the end 59 of the respective wall 50 and by an end of the respective wall 52 opposite the end 58.

The channels 28 have a progressively decreasing thickness in an orthogonal direction to the respective walls 50, running from the ends 57 towards the respective ends 59, i.e. from the heat exchanger 20 towards the respective openings 43.

The portion 45 comprises, running from the turbines 14 towards the discharge duct 17 (FIGS. 6, 8 and 11):
a wall 65 surrounding the nozzle 15; and
a wall 66 axially offset with respect to the nozzle 15, and provided with a plurality of lobes 67 protruding in a cantilever fashion towards the axis A from a radially internal surface 69 of the wall 66 itself and a plurality of through openings 68.

With particular reference to FIG. 8, the wall 65 is shaped like an arc coaxial to the axis A.

The wall 65 extends between the ends 59 of the respective walls 51.

The wall 65 surrounds an arcuate section of corresponding angular width of the nozzle 15.

The wall 65 extends, in the case illustrated, over an arc of about ninety degrees and extends symmetrically to an axis B orthogonal to the axis A and arranged vertically in a normal flight configuration of the helicopter 1.

The wall 66 is filleted to wall 52.

The lobes 67 are angularly equally spaced around the axis A and are arranged at the respective lobes 32 of the nozzle 15, running parallel to the axis A.

The openings 68 are angularly equally spaced around the axis A and elongated along the axis A.

Each opening 68 is associated with a respective lobe 67.

The lobes 67 protrude in a cantilever fashion from the wall 66 at respective openings 68.

The wall 66 is partially housed inside the discharge duct 17.

More in particular, the discharge duct 17 comprises an annular end 71 opposite the mouth 18. The end 71 defines an annular groove 81 with the wall 65 axially opposite to the wall 46.

In particular, the discharge duct 17 has, running from the end 71 towards the mouth 18, a section 73 converging with respect to the axis A, a section 74 with constant diameter and a section 75 diverging with respect to the axis A.

The groove 81 and the openings 68 fluidically connect the motor bay 8 with the downstream section 49 of the nozzle 16.

The wall 66 comprises an annular end 82 axially opposite to the wall 46, housed inside the discharge duct 17 and radially spaced from said discharge duct 17.

In particular (FIG. 12), the portion 44 extends symmetrically to the axis B orthogonal to the axis A and is arranged above the axis A, with reference to the normal operating configuration of the helicopter 1. The air intake 25 is arranged below the main rotor 3. In this way, the downward flow generated by the main rotor 3 causes a dynamic stream inside the air intake 25, which further contributes to cooling the heat exchanger 20.

According to an alternative embodiment illustrated in FIG. 13, the portion 44 extends symmetrically to an axis C inclined with respect to the axis A and is arranged above the axis A with reference to the normal operating configuration of the helicopter 1.

According to an alternative embodiment illustrated in FIG. 14, the portion 44 extends symmetrically to an axis D inclined with respect to the axis A and is arranged below the axis A with reference to the normal operating configuration of the helicopter 1.

The support body 40 also comprises a heat dissipation device 100 provided to protect the heat exchanger 20 from possible damage caused by the heat transmitted by the motor system 6.

In greater detail, the device 100 comprises (FIG. 7):
a grid 101 applied on the wall 65 in a position radially interposed between the heat exchanger 20 and the nozzle 15; and
a grid 102 interposed between the wall 66 and the wall 52.

In particular, the grid 101 is shaped like an arc symmetrical with respect to the axis A and having a lower angular extension of the wall 65.

The grid 101 is arranged below the walls 50.

The grid 102 extends obliquely to axis A.

The helicopter 1 also comprises a device 55 for protecting the heat exchanger 20 from possible "heat shocks" which can temporarily overheat the oil present in the heat exchanger 20. Said excess of heat can occur due to the hot gases, which therefore tend to stagnate to a small extent in the nozzle 15 or along the discharge duct 17, once the motor system 6 is inactive. Another situation in which unpredicted overheating of the heat exchanger 20 can occur is the presence of flames inside the channels 28, for example following a failure of the motor system 6 and and/or fire in the motor bay 8.

In greater detail, the device 55 is selectively movable, between:
- an open configuration in which it allows the fluidic connection between the heat exchanger 20 and the discharge duct 17; and
- a closed configuration in which it interrupts the fluidic connection between the heat exchanger 20 and the discharge duct 17.

More precisely, the device 55 is arranged in the open configuration during the normal operation of the motor system 6 and/or in the absence of flames inside the channels 28.

Conversely, the device 55 is arranged in the closed configuration when the motor system 6 is inactive or in the presence of flames inside the channels 28.

In an embodiment of the invention, the device 55 is reversibly movable from the open configuration to the closed configuration through passive systems (for example elastic elements, shape memory metal alloys and the like) or through active systems (for example an electric, hydraulic or pneumatic actuator, or a suitable combination of the principles mentioned herein).

The helicopter 1 further comprises:
- a sensor 54 (only schematically illustrated in FIG. 8) adapted to detect the fact that the motor system 6 is inactive and/or the presence of flames inside the channels 28; and
- an actuator (not illustrated) controlled by the sensor and adapted to displace, according to what is detected by the sensor, the device 55 between the open and closed configurations.

In the case illustrated in FIG. 8, the device 55 is formed by the walls 50, which are hinged to the support body 40 around a common axis parallel to the axis A and coinciding with the common ends 57 of the respective walls 50.

The ends 59 leave the respective openings 43 free when the device 55 is in the closed configuration and leave said openings 43 free when the device 55 is in the open configuration.

In use, the first flow rate of air is sucked from the air intake 9 and reaches, through the intake duct, the compressor 11 of the motor system 6.

The air intake 10 allows the entry of a stream of air into the motor bay 8.

The first flow rate of air is compressed inside the compressor 11 and reacts with the second fuel flow rate inside the combustion chamber 13 generating the third flow rate of exhaust gases and air at high temperature and pressure.

Subsequently, the third flow rate of exhaust gases and air expands into the turbine 14 by driving the compressor 11 and the outlet shaft in rotation around the axis A.

Said third flow rate expands further into the nozzle 15 by reducing its static pressure at the downstream section 39.

Said reduced static pressure at the downstream section 39 causes a fourth flow rate of air to be drawn through the air intake 25 and the ducts 26. Said fourth flow rate reaches the openings 43 of the channels 28 in fluidic connection with the downstream section 39 of the nozzle 15.

Said fourth flow rate of air, crossing the heat exchanger 20, cools it and mixes with the third flow rate in the downstream section 39 of the nozzle 15, so as to form the fifth flow rate.

The fifth flow rate of exhaust gases and air further expands in the nozzle 16, therefore reducing its own static pressure at the downstream section 49 of the nozzle 16 itself.

Thanks to said reduction of the static pressure, the ejector 90 generates, at the downstream section 49, a sixth flow rate of low temperature air inside the motor bay 8 and through the air intake 10.

Said sixth flow rate of air by-passes the compressor 11, the combustion chamber 13 and the turbine 14, and cools the motor bay 8.

Said sixth flow rate of air flows from the motor bay 8 to the downstream section 49 through the groove 81 and the openings 68 of the portion 45, so as to cool the motor bay 8 (FIG. 2).

Said sixth flow rate of air mixes with the fifth flow rate of air at the downstream section 49, so as to form the seventh flow rate of air.

Said seventh flow rate of air crosses the discharge duct 17 until it reaches the mouth 18, through which it is emitted into the atmosphere.

The device 55 is arranged in the open configuration during normal operation of the motor system 6 and/or in the absence of flames inside the channels 28.

In said open configuration, the device 55 does not interfere with the flow of the stream of air in the channels 28.

If the sensor 54 identifies that the motor system 6 is inactive or the presence of flames inside the channels 28, the device 55 is arranged in the closed configuration, for example by means of a relative actuator, for example by rotation of the walls 50 around the common axis for hinging to the support body 40.

In said closed configuration, the device 55 prevents the return of flames through the channels 28 and towards the heat exchanger 20, preserving their integrity.

The device 100 favours the dissipation of the heat generated by the motor system 6 preferably within the motor bay 8, further contributing to preserving the integrity of the heat exchanger 20.

More precisely, the air heated by the motor system 6 rises inside the nozzle 15 until it reaches the grids 101, 102, which allow it to escape and be disposed of.

From an examination of the characteristics of the helicopter 1 made according to the present invention, the advantages that it allows to obtain are evident.

In particular, the downstream section 39 of the nozzle 15 is fluidically connected with the heat exchanger 20 and the downstream section 49 of the nozzle 16 is fluidically connected with the motor bay 8.

Consequently, the ejector 80 generates the fourth flow rate of air, which crosses and cools the heat exchanger 20.

The ejector 90 generates the sixth flow rate of air, which crosses and cools the motor bay 8.

Since the fourth and sixth flow rate of air travel through respective distinct paths upstream of the discharge duct 17, it is possible to independently control the cooling of the heat exchanger 20 and the cooling of the motor bay 8, unlike the solutions of the known type and described in the introductory part of the present description.

Consequently, a more precise and accurate control of the temperatures of the motor system 6 and/or of the motor bay 8 is possible without the installation of additional devices, which complicate the maintenance of the helicopter 1 and weigh on the overall weight of the same, as can be seen in the solutions of the known type and described in the introductory part of the present description.

The lobes 67 define an extension of the nozzles 15, 16. In particular, the lobes 67 represent a completion from the fluid dynamic point of view of the interaction between the nozzles 15 and 16.

In fact, as previously described, the lobes 67 are preferably arranged at the respective lobes 32 of the nozzle 15, running parallel to the axis A.

Thanks to this, it is possible to reduce the turbulence and the fluid dynamic losses due to the flow of the third and fifth flow rate of air and exhaust gases inside the respective nozzles 15, 16.

The device 100 allows to dissipate the heat generated by the operation of the motor system 6 inside the motor bay 8, reducing the risk of damage to the heat exchanger 20.

Heat dissipation occurs by convection and is made more efficient by the fact that the grid 101 is located above the motor system 6. Thanks to said position, "hot" air and, hence, with a lower density of the air present in the motor bay 8, present in the motor system 6, naturally tends to move towards the grids 101, 102 and move away from the heat exchanger 20.

The device 55 is selectively movable, below between:
- an open configuration in which it allows the fluidic connection between the heat exchanger 20 and the discharge duct 17 through the channels 28; and
- a closed configuration in which it interrupts the fluidic connection between the heat exchanger 20 and the discharge duct 17 through the channels 28.

In this way, it is possible to further reduce the risk of damaging the heat exchanger 20, following the stagnation of hot air inside the channels 28 once the motor system 6 is inactive in the presence of open flames.

With detail in the accompanying FIG. 12, the portion 44 extends symmetrically to the axis B orthogonal to the axis A and is arranged above the axis A. Therefore, the inflow of fresh air through the air intake 25 benefits from a dynamic stream induced by the flow downwards and towards the air intake 25 generated by the main rotor 3. Said dynamic stream is of the same order of magnitude as the fourth and sixth flow rates generated respectively by the ejectors 80, 90 through the heat exchanger 20 and the motor bay 8 respectively.

With particular reference to FIG. 13, the portion 44 extends symmetrically to the axis C inclined with respect to the axis A. In this condition, the contribution of the aforesaid dynamic stream is less than in the configuration of FIG. 12 and the ejectors 80, 90 generate the predominant part of the fourth and sixth flow rate respectively through the heat exchanger 20 and the motor bay 8, respectively.

With reference to FIG. 14, the portion 44 extends symmetrically to the axis D inclined with respect to the axis A and arranged below the axis A, with reference to the normal operating configuration of the helicopter 1.

In said configuration the dynamic contribution of the rotor 3 is practically negligible. Therefore, the draw of the fourth flow rate of air and sixth flow rate of air is effectively obtained only through the respective ejectors 80, 90.

Finally, it is clear that modifications and variations may be made to the helicopter 1 described above without thereby departing from the scope of protection of the present invention.

In particular, the helicopter 1 could comprise a pair of motor systems 6 having respective outlet shafts operatively connected to the main rotor 3.

Figure 15:
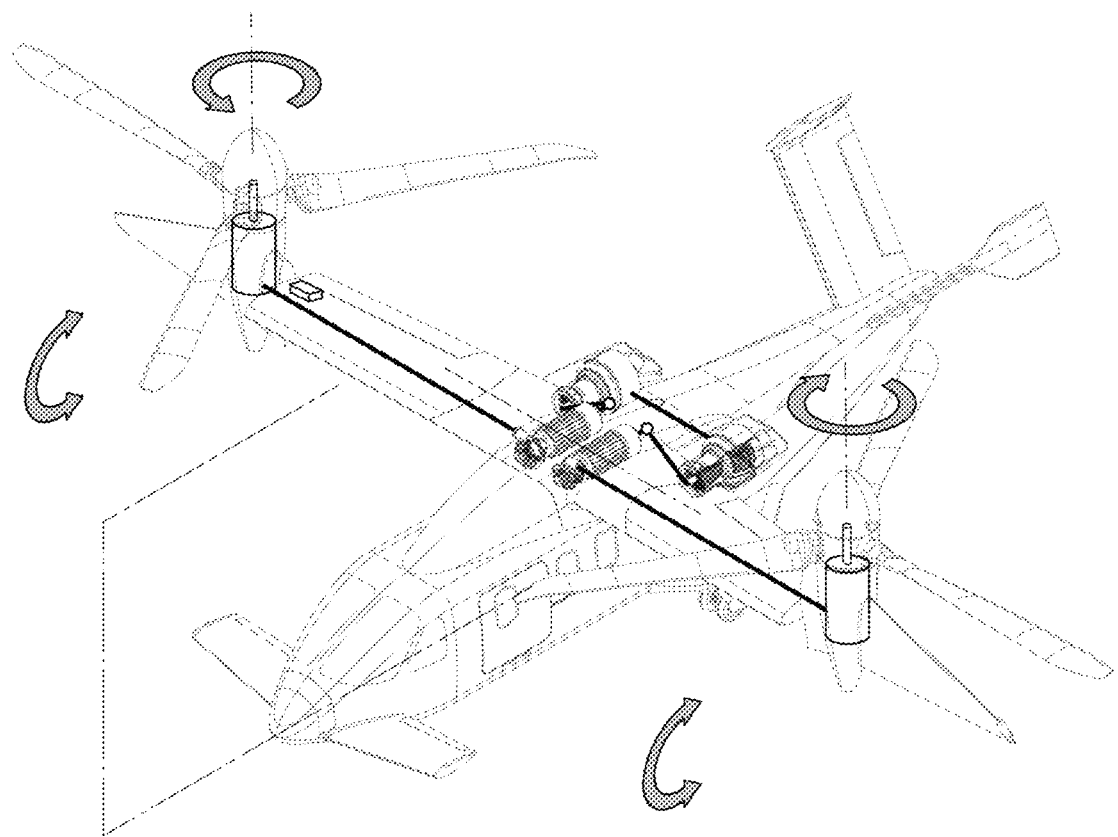
FIG. 15 illustrates an embodiment of a convertiplane.

The aircraft capable of hovering could be a convertiplane instead of the helicopter 1. An embodiment of a convertiplane is shown in FIG. 15.

The invention claimed is:

1. An aircraft capable of hovering comprising:
a motor bay;
a motor system housed in part inside said motor bay and comprising, in turn, a discharge duct extending at least in part outside said motor bay;
a heat exchanger arranged outside said motor system;
a first air intake fluidically connected with said heat exchanger;
a first duct extending between said first air intake and said discharge duct and along which said heat exchanger is arranged;
a first converging nozzle having a downstream section fluidically connected with said discharge duct and with said first duct, so as to create a first flow of air adapted to cool said heat exchanger; and
a second air intake that is open in said motor bay and distinct from said first air intake;
wherein the aircraft comprises a second converging nozzle having a second downstream section fluidically connected with said discharge duct and with said motor bay, so as to create a second flow of cooling air of said motor bay directed from said second air intake towards said discharge duct and by-passing a combustion chamber and a turbine of the motor system.

2. The aircraft according to claim 1, wherein said first and second nozzles are coaxial with each other.

3. The aircraft according to claim 1, wherein said first nozzle is at least partially housed inside said second nozzle.

4. The aircraft according to claim 1, wherein the discharge duct has an annular end that includes a first annular opening positioned adjacent to said second downstream section and in fluidic communication with said motor bay to define a first passage path of said second flow of air.

5. The aircraft according to claim 1, further comprising a plurality of second openings passing through said second converging nozzle and fluidically connected with said motor bay, so as to define a second passage path of said second flow of air.

6. The aircraft according to claim 1, wherein said first nozzle comprises a plurality of first lobes interacting, in use, with said first flow of air;
said second nozzle comprising a plurality of second lobes interacting, in use, with said second flow of air and defining respective extensions of respective said first lobes.

7. The aircraft according to claim 6, wherein each said second lobe is arranged at a respective said second opening.

8. The aircraft according to claim 1, further comprising a single support body, which defines said second nozzle and to which said heat exchanger is fixed;
said single support body further defining at least one channel of said first duct which couples to a first side of said heat exchanger, a second side of the heat exchangers couples to said second air intake.

9. The aircraft according to claim 8, wherein said single support body comprises:
a first wall; and
wherein the at least one channel includes a pair of channels at least partially surrounding said first nozzle and in fluidic communication with said heat exchanger;
said channels being in fluidic communication with said first downstream section at their openings opposite said heat exchanger.

10. The aircraft according to claim 9, wherein said support body comprises a pair of second walls transverse to said first wall, which delimit respective said channels, extend starting from said heat exchanger and are interrupted at respective said openings.

11. The aircraft according to claim 8, wherein said support body comprises a heat dissipation device that is open towards said motor bay.

12. The aircraft according to claim 10, further comprising:
a sensor adapted to detect the fact that said motor system is inactive and/or the presence of flames inside one of said channels;
an actuator controlled by the sensor and adapted to displace, according to what is detected by the sensor, said second walls, which are selectively movable, based on the detection of said sensor, between:
an open configuration in which they allow the fluidic connection between said exchanger and said discharge duct through said channels; and
a closed configuration in which they interrupt the fluidic connection between said exchanger and said discharge duct through said channels.

13. The aircraft according to claim 1, wherein said heat exchanger is a radiator adapted to cool a lubricating fluid, which lubricates, in use, said motor system.

14. The aircraft according to claim 1, characterized in that said motor system comprises:

a third air intake distinct from said first air intake and second air intake;
a compressor sucking, in use, a third flow of air from said third air intake;
a combustor receiving, in use, said third flow of compressed air from said compressor providing, in use, at the outlet, a fourth flow of air and exhaust gases;
at least one turbine adapted to expand, in use, said fourth flow of air and exhaust gases;
said first nozzle supplied, in use, by said at least one turbine with said fourth flow and said third flow, wherein the mixture of the third and fourth flow creates a fifth flow;
said second nozzle supplied, in use, by said first nozzle with said fifth flow providing, at the outlet, the sixth flow; and
said discharge duct supplied, in use, by said second nozzle with said sixth flow.

15. The aircraft according to claim 1
further comprising a main rotor arranged above said first air intake so as to generate, in use, a stream of air through said first duct.

* * * * *